United States Patent

[11] 3,601,642

| | | |
|---|---|---|
| [72] | Inventor | David M. Willyoung<br>Scotia, N.Y. |
| [21] | Appl. No. | 4,888 |
| [22] | Filed | Jan. 22, 1970 |
| [45] | Patented | Aug. 24, 1971 |
| [73] | Assignee | General Electric Company |

[54] MULTI-THREE PHASE WINDING WITH INTERCHANGED CIRCUIT SEQUENCE
9 Claims, 3 Drawing Figs.

[52] U.S. Cl. ..................................................... 310/198,
310/202, 310/206
[51] Int. Cl. .................................................... H02k 3/00,
H02k 27/02
[50] Field of Search .......................................... 310/198,
202, 206

[56] References Cited
UNITED STATES PATENTS

| 2,015,562 | 9/1935 | Kilgore | 310/202 |
| 2,745,029 | 5/1956 | McElligott | 310/202 |
| 2,778,962 | 1/1957 | Taylor | 310/202 |
| 2,778,963 | 1/1957 | Haberman, Jr. | 310/202 |
| 3,152,273 | 10/1964 | Harrington | 310/198 |
| 3,201,627 | 8/1965 | Harrington | 310/198 |
| 3,408,517 | 10/1968 | Willyoung | 310/198 |
| 3,430,126 | 2/1969 | Richardson et al. | 310/198 X |
| 3,515,922 | 6/1970 | Fong | 310/198 |

*Primary Examiner*—D. X. Sliney
*Assistant Examiner*—Mark O. Budd
*Attorneys*—William C. Crutcher, Frank L. Neuhauser, Oscar B. Waddell and Joseph B. Forman

ABSTRACT: A polyphase armature winding for a dynamoelectric machine with a plurality of three phase, two-layer lap windings, each phase of each winding consisting of a different number of parallel-connected circuits than the number of rotor poles. The circuit sequence of the coil sides in the top layer is in partially or wholly interchanged relationship with the sequence of the bottom layer coil sides. The pitch of the windings may vary from five-sixths to one-full pole pitch. Although applicable to many variations, the winding is exemplified by a six-phase generator with two-phase belts per phase and four parallel-connected circuits per phase.

INVENTOR
DAVID M. WILLYOUNG
BY W. C. Crutcher
ATTORNEY

INVENTOR
DAVID M. WILLYOUNG

MULTI-THREE PHASE WINDING WITH INTERCHANGED CIRCUIT SEQUENCE

BACKGROUND OF THE INVENTION

This invention relates to dynamoelectric machines, and more particularly to polyphase generator armature windings having a plurality of parallel-connected circuits constituting each phase.

A typical turbine-driven polyphase generator includes a stator containing armature windings, and a field element provided with one or more pairs of magnetic poles mounted rotatably within the stator. Often a field element having two poles is provided, and rotated at 3600 r.p.m. to furnish polyphase electric power at a frequency of 60 Hertz or cycles per second.

The stator includes a core constructed of laminated magnetizable material and is generally in form of a hollow cylinder. The inner surface of the core has radially extending slots formed therein axially throughout the length of the core. Winding elements known as stator bars, each consisting of a plurality of insulated conductors, are placed in the slots. As the bars emerge from either end of the stator core, means are provided to interconnect the bars to form a plurality of circuits, one or more of which constitute a phase of the armature winding. Two stator bars are placed in each slot, one above the other to form a top and a bottom winding layer.

Two serially connected bars may be considered to form a coil which encloses that portion of the core lying between the slots containing the bars. Each coil comprises a top and a bottom layer bar or coil side, which lie in circumferentially displaced slots. Ordinarily, for reasons to be explained, the coil sides are less than one full pole pitch apart, a pitch being defined as 180 electrical degrees, or equivalently, 360 mechanical degrees divided by the number of poles on the rotor. A group of adjacent top layer coil sides carrying current of the same phase, and the group of angularly displaced bottom layer coil sides connected thereto are generally referred to as a "phase belt." All of the coils in a phase belt may be serially connected, or they may be connected to form a plurality of serial circuits each comprising one or more coils. When more than one circuit, or parts of more than one circuit, are located in a phase belt, it is necessary to select the coils or coil sides which are serially connected in each circuit in such a way that the phasor sum of the generated voltages in the coil sides in each circuit is substantially the same in phase angle and magnitude, in order to avoid excessive circulating currents between the parallel-connected circuits.

A large, central station generators have increased in rating and physical size, the magnetic flux per pole has increased. Consequently, the generator voltage would have increased in direct proportion to the flux if the identical armature winding configuration had been maintained. To avoid excessive voltage, which would require excessive thicknesses of ground wall insulation on the armature winding conductors, as well as extremely complex measures at the generator terminals to avoid dielectric breakdown or corona, more parallel circuits per phase have been used as ratings have increased. To avoid excessive circulating currents when a greater number of paralleled circuits per phase than the number of rotor poles has been used, careful selection of the coils or coil sides which are serially connected has been necessary. For ratings where many narrowly spaced stator slots could be employed, there were many coil sides per phase to distribute between the various circuits of a phase. It was frequently possible to find suitable combinations of serially connected coils with almost identical generated voltages in each circuit, permitting the circuits to be paralleled without excessive circulating current. An example of this prior art is shown in U.S. Pat. No. 2,778,962, granted to H. D. Taylor and assigned to the assignee of the present invention.

With the advent of fluid-cooled conductors, larger armature bars have become necessary in order to accommodate the coolant flow passages. This has reduced the number of stator slots, but greatly increased the current-carrying capability of each slot. As generator ratings have continued to increase, it has become necessary to once again subdivide the number of armature conductors assigned to a given phase into a greater number of parallel circuits in order to avoid excessive generator terminal voltage and correspondingly increased requirements for additional insulation thickness on the armature conductors. Increased insulation thickness reduces the area available in the generator cross section for active magnetic and current carrying material.

In U.S. Pat. No. 3,408,517, granted to D. M. Willyoung which is incorporated by reference and assigned to the assignee of the present invention, a winding pattern is taught which reduces the voltage unbalance between separate circuits of serially connected conductors in a phase winding permitting the subdivision of the conductors within the phase winding into separate circuits with substantially balanced generated voltages in each circuit, even when the number of stator slots in the generator is relatively low. This is done by utilizing variable pitch coils throughout the phase belt, arranged in such a way that they have their first sides distributed in one circuit sequence in the top winding layer of a first group of consecutive slots of a two-layer lap winding and their second coils sides distributed in an interchanged, or transposed, circuit sequence in the bottom winding layer of a second group of consecutive slots. By so doing, the net differences between the generated voltages in each circuit of a phase would exist if uniform pitched coils were employed are reduced substantially by a multiplying factor hereafter to be called the "interchange factor." The interchange factor is a function of the average coil pitch for the entire phase belt and approaches zero (i.e. no voltage unbalance) when the average coil pitch is unity (i.e. full pitch coils). Unfortunately, the utility of even this arrangement for reducing the generated voltage unbalances between paralleled circuits in a three-phase winding becomes limited by harmonic losses if ratings are increased still more and the number of armature slots is reduced to avoid excessive terminal voltage, since the largest coil pitch which can be employed in a three-phase generator without excessively high loss-producing harmonics is approximately five-sixths of full pole pitch, or 150 electrical degrees.

It is known that the order of the harmonics produced by a plurality of equally spaced windings is given by the expression $(nq\pm 1)$, where $q$ is the number of phase belts per pole pair and $n$ assumes all successive integer values, 1, 2, 3—. This expression reveals that an ordinary three-phase winding having six-phase belts per pole pair will produce fifth and seventh, 11th and 13th and higher order harmonics. The magnitude of each harmonic is proportional to the harmonic pitch factor for the particular winding divided by the order of the harmonic itself. The losses produced by the flux associated with each magnetomotive force (m.m.f.) harmonic tend to vary as the square of the harmonic magnitude. Consequently, the principal losses are produced by the lower order harmonics of the m.m.f., i.e. the fifth and seventh harmonics in a three-phase generator.

In prior art three-phase generators, the principal low order harmonics have been eliminated by restricting the average pitch of the winding to approximately five-sixths of full pole pitch in order to "pitchout" as nearly as possible the two lowest order harmonics produced by the armature winding currents, namely, the fifth and seventh harmonics. Since the magnitude of each harmonic m.m.f. produced by currents in the armature winding coils is directly proportional to the harmonic pitch factor for that particular harmonic and inversely proportional to the order of the harmonic, the two lowest harmonics can both be reduced in magnitude to some degree by selecting a coil pitch which lies in the vicinity of $(q-1)/q$, or five-sixths, for a three-phase winding with six-phase belts.

The harmonic fluxes produced by the armature winding m.m.f.'s rotate around the gap, and intercept the rotor surface and move over it at a relative frequency of $\pm nqf$, where $n$ and $q$ have the same meanings as previously stated and $f$ is the generator fundamental frequency. These fluxes moving relative to the rotor surface induce losses in it of substantial amounts. The losses produced by each harmonic term will tend to vary as the square of the magnitude of that harmonic, but will be modified from this relationship due to variations in the depth of penetration for the harmonic currents resulting from saturation and interaction effects. Nonetheless, it is evident that the major loss components are produced by the larger magnitude harmonics, which is why the average pitch of prior art armature coils is carefully restricted to about five-sixths for highly rated three-phase generators, where rotor pole face losses are of serious concern.

If the aforementioned restriction (of the average coil pitch of the armature winding to about five-sixths in order to control principal low order harmonic losses) were eliminated, the coil pitch could increase to values much closer to unity, or even unity itself in some cases. This, in turn, would permit voltage differences between paralleled circuits per phase to be reduced to very low values if the top and bottom coil side circuit sequences for each phase belt were interchanged, even though the number of serially connected armature conductors in each circuit might be very small. This would permit generators of very high KVA rating to be built at relatively low terminal voltage levels because the total output current could be carried by many paralleled circuits per phase and by more phases than is common practice. This would not only allow generators of extremely large rating to be built with no increase in present voltage levels, or complications that would be required if the voltage level did increase, but it also would produce generator designs which required a very low amount of insulation in the total generator cross section. Highly rated machines could be built in very compact form, thereby reducing the problems of shipment and manufacture of very large generators for central stations. Also improved exciter alternators would be available suitable for producing output power for rectification and feeding to low voltage field windings of such generators.

Accordingly one object of the present invention is to provide an improved armature winding where greater KVA output can be obtained without increasing the stator voltage.

Another object of this invention is to provide a polyphase multiple circuit armature winding with less voltage unbalance between paralleled circuits than has heretofore been possible.

A further object of this invention is to provide a multi-3 phase armature winding, each phase consisting of more than one parallel circuit for each rotor pole.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

SUMMARY OF THE INVENTION

Briefly stated, the invention comprises subdividing the winding of a polyphase dynamoelectric machine into more than one three phase set, each phase of each set having more than one parallel-connected circuit in at least some of its phase belts; and increasing the winding pitch to a value greater than five-sixths pitch by the use of interchanged circuit sequences in the top and bottom coil side layers so as to reduce circulating currents between circuits while also substantially eliminating losses due to the lowest order harmonics.

DESCRIPTION OF THE PREFERRED EMBODIMENT

Figure 1:
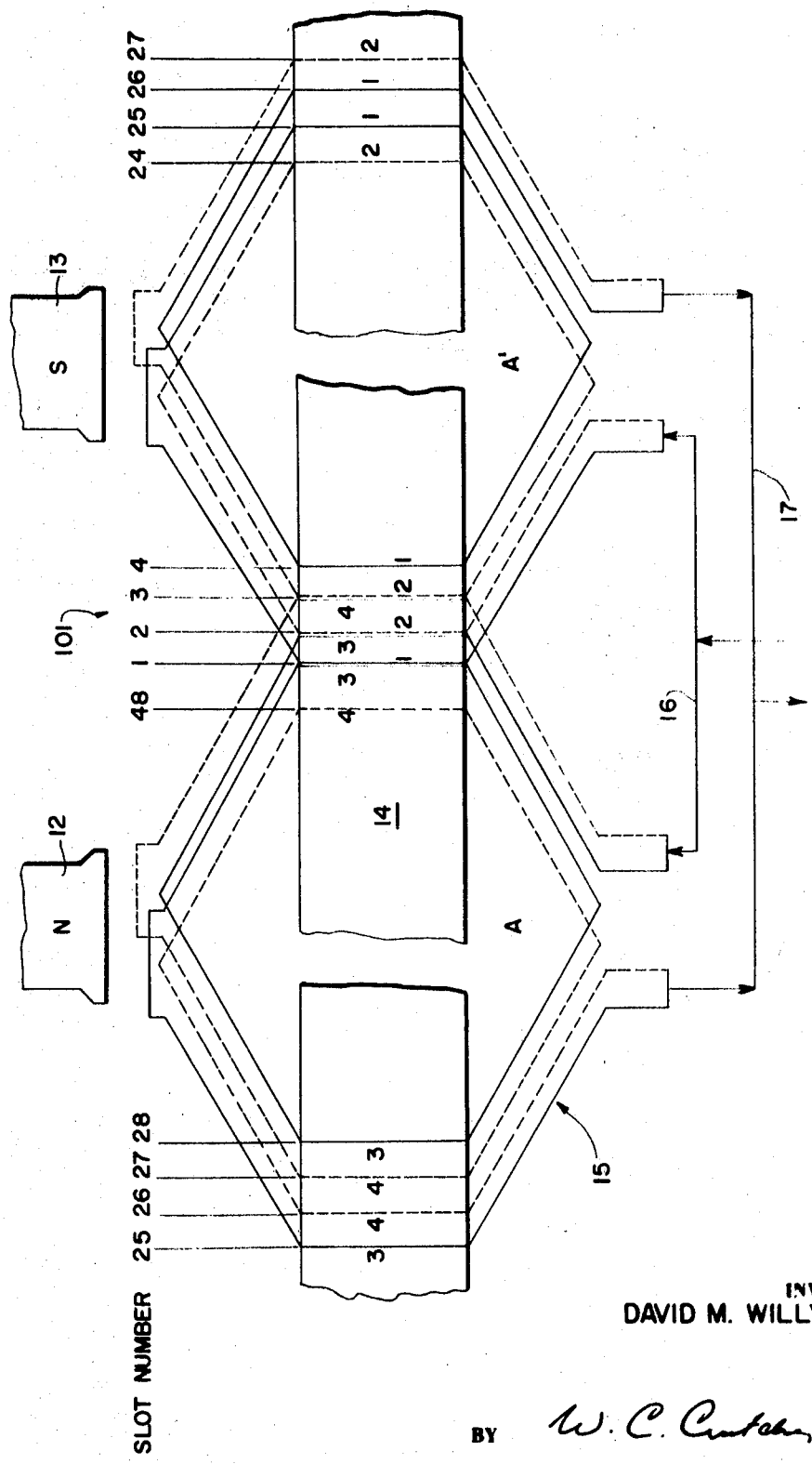
FIG. 1 is a schematic winding pattern for a six-phase, two-pole, 48-slot generator having four parallel circuits per phase, showing only one of the six phases.

Referring now to FIG. 1, there is illustrated a dynamoelectric machine 101 in the form of a six phase generator having a filed element, with poles 12 and 13 rotatably mounted within a slotted, magnetizable stator core 14. The core 14 has 48 evenly spaced slots placed therein and a two-layer lap winding disposed in the slots. Only one of the six phase windings is shown in FIG. 1, this being indicated at 15. The other five phase windings would be identical, but angularly displaced in the slots as known to those skilled in the art. Two-phase belts indicated by A and A' are shown, each phase belt comprising four stator coils. Each coil has a first side disposed in the upper half, or top, of one slot, and a second side disposed in the lower half, or bottom, of a circumferentially displaced slot. The four coils of each phase belt are connected to form two parallel circuits, each circuit comprising two series-connected coils. The circuits are numbered 1, 2, 3, and 4, each circuit having a first end connected to connection ring 16 and a second end connected to connection ring 17. For purposes of the present discussion, those coils having sides which lie in adjacent slots, and which are connected to a common connection ring, will be considered to comprise a phase belt.

It will be seen that the windings of phase belts A and A' overlap at slots 25, 26, and 27. Opposite sides of the phase belts also overlap in slots 1, 2, and 3; however, since FIG. 1 presents a developed view of the windings and stator, the last-mentioned overlapping is not indicated therein.

The top-layer windings of phase belt A' begin in slot no. 1, and the bottom-layer windings in slot no. 24. Similarly, the top-layer windings of phase belt A begin in slot no. 25 and those of the bottom layer in slot no. 48. For the two-pole, 48-slot machine illustrated, the phase belt pitch is therefore 23 slots, or twenty-three twenty-fourths of full pole pitch.

In the prior art, as previously mentioned, the average pitch of the armature coils has been restricted to about five-sixths for highly rated three-phase generators, where rotor pole face losses are of serious concern. In the present invention, by providing a greater number of phase belts per pole, the lower order harmonics found in three-phase windings will be absent. For example, a six-phase winding with 12-phase belts per pole pair will develop only an 11th and 13th harmonics, a 23rd and 25th harmonic, a 35th and 37th harmonic,—in contrast to the fifth and seventh, 11th and 13th 17th and 19th,—harmonics that the normal three-phase winding produces. Similarly, a nine-phase generator with 18-phase belts per pole pair will produce only a 17th and 19th, 35th and 37th—harmonics. For such multi-3 phase generators, local losses due to harmonics will be inherently much lower, providing greater flexibility in the selection of the average armature coil pitch. For the same reasons that the best pitch of a three-phase winding is about five-sixths, the optimum pitch of a six-phase winding with 12 phase belts per pole pair will be approximately eleven-twelfths to reduce the magnitude of the two lowest order harmonics, the 11th and 13th order. However, because the magnitude of these harmonics is inherently lower, much larger deviation from this optimum value can be tolerated.

It has been found that by using the winding patterns taught by U.S. Pat. N. 3,408,517, referred to above, voltage imbalance between voltages generated in the parallel circuits of a common phase belts may be minimized. Basically, the winding pattern of the above-mentioned patent teaches the distribution in a first sequence of top-layer sides of those stator coils comprising the parallel circuits of a first phase belt, and distributing the opposite coil sides, aligned in a lower-layer winding, in a transposed sequence. With this transposed distribution, the reduction in voltage imbalance between the circuits in a phase belt is given by the following expression, which has been called the "Interchange Factor" in the early sections of this disclosure.

Interchange Factor $= j \times \text{cotangent}(90° \times p)$ where $p$ is coil pitch and $j$ represents a 90° phase shift in the direction of the imbalance voltage between circuits. For a five-sixths pitch winding, heretofore the maximum feasible pitch which could be used, the magnitude of the interchange factor given by the above expression is 0.268: i.e., the voltage imbalance is reduced to only 26.8 percent of that available from previously known methods. Referring to FIG. 1, for example, the sequence of the top-wound coil sides of phase belt A is 3443, while the sequence of the opposite, bottom-wound coil sides is 4334. A similar interchanged circuit sequence is apparent in the coils of phase belt A' where the top layer sequence is 1221 and the bottom layer sequence is 2112. As is taught in U.S. Pat. No. 3,408,517, for a five-sixths average coil pitch winding, this arrangement converts the phase angle imbalance between circuits 3 and 4 (and between circuits 1 and 2) in the top or bottom layer alone into an in-phase voltage imbalance in their sum, its relative magnitude being reduced to only 26.8 percent what it would have been if uniform pitch coils had been employed, so that the circuits may be paralleled with lessened circulating currents therebetween.

By using a six-phase winding in the present invention with a total of twelve phase belts per pole pair, the lower-frequency harmonics are eliminated and pitch need no longer be restricted to a value close to five-sixths. By expanding the average coil pitch, the voltage imbalance between circuits of a phase belts, as given by the above expression, can be lessened significantly. For example, by using twenty-one twenty-fourths pitch the magnitude of the "interchange factor" is 0.199; by using an eleven-twelfths pitch the magnitude is reduced to 0.132; and by using a twenty-three twenty-fourths pitch as shown in the FIG. 1 embodiment, it is reduced still further to only about one-sixteenths (i.e. 0.0655) of the imbalance in the original coil side pattern. In other words, circuit sequences with approximately 16 times as much voltage imbalance between the serially connected conductors in the coil side sequence can be employed, for this pitch ratio and construction, as taught by the Taylor patent. Relative to a three-phase machine where the coil pitch is restricted to about five-sixths as taught by the Willyoung U.S. Pat. No. 3,408,517, the twenty-three twenty-fourths pitch six-phase machine can tolerate roughly four times as much imbalance between the generated voltages in the serially connected conductors in either phase belt coil side layer. For very highly rated generators with relatively low terminal voltage and very few serially connected conductors in a circuit, the imbalance voltage between circuits would be prohibitively high were it not for the substantial reduction which can be obtained by interchanging the circuit sequence and choosing an average coil pitch well in excess of five-sixths, even approaching unity. By using a 100 percent pitch, voltage imbalance may be reduced to zero with a corresponding absence of circulating currents between parallel phase belt circuits, and a commensurate increase in machine output.

Figure 2:
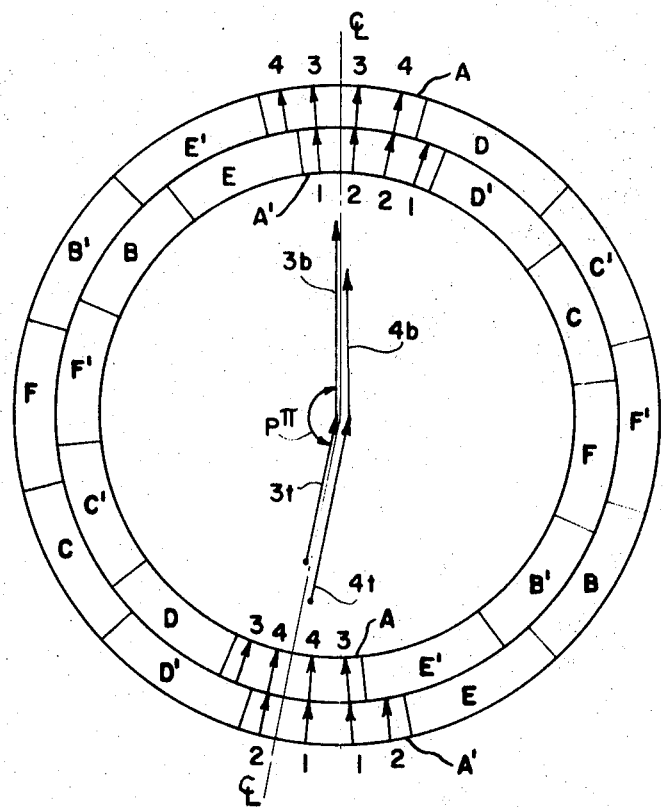
FIG. 2 is a diagrammatic representation of the windings comprising the two phase belts of one phase of a six-phase armature.

FIG. 2 shows the peripheral distribution of the windings of phase belts A and A' in a stator core. An arrow representing a phasor is provided at the location of each coil side within the core to indicate the relative phase of the voltage induced therein and a number 1, 2, 3, or 4 indicates the designation of the circuit of which the coil side is a part. The overlap of phase belts A and A' is clearly evident, three of the four slots containing coil sides from a given phase belt also containing coil sides from the other belt of the phase.

In the embodiment shown, due to the symmetrical placement of circuit conductors about the centerline of each phase belt half, the phasor sum of the coil side voltages for each circuit are oriented along the centerlines of the respective phase belt halves, but are different in magnitude by a small amount. The reversal of the circuit sequence for the conductors for the bottom layer half of the phase belt relative to the top layer half of the phase belt, causes the phasor sum of the bottom layer circuit voltages to be in phase coincident with each other, but with relative magnitudes for each circuit in reversed relationship relative to the circuit sums for the top layer half of the phase belt. Thus, in FIG. 2, phasors $3_t$ and $4_t$, representing those portions of circuits 3 and 4 which lie in the radially inward, or "top" winding layers are both located along the centerline of the top-layer phase belt half but are of unequal lengths. Similarly phasors $3_b$ and $4_b$ represent the portions of circuits 3 and 4 lying in the bottom winding layer and are located along the centerline of the bottom-layer phase belt half. The two centerline of the phase belt halves form an angle $p\pi$, which corresponds to the average pitch of the coils in the phase belt, so that the voltages generated in the top and bottom phase belt halves are slightly out of phase. In order to avoid confusion because of phasor lines and arrowheads lying on top of one another they are slightly offset from one another in the drawing so that the separate phasors can be distinguished.

Figure 3:
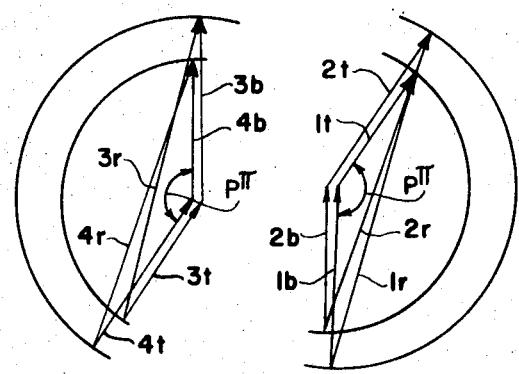
FIG. 3 is a vector diagram of the voltages generated in the two-phase belts shown in FIG. 1 and 2.

Referring now to FIG. 3, a phasor representation is shown of the voltages generated in the various phase belt halves. The phasor labeled $3_r$ is the vector sum of voltages $3_t$ and $3_b$ generated in the top and bottom layer windings of circuit 3. Similarly, phasor $4_r$ is the vector total of voltages $4_t$ and $4_b$. Due to the differing magnitudes of the voltages in a given phase belt segment, the resulting phasors, $3_r$ and $4_r$, differ slightly in phase angle but are equal in magnitude. As taught in U.S. Pat. No. 3,408,517, when the top- and bottom-layer winding sequences are transposed, the imbalance in generated voltages between the separate, parallel circuits 3 and 4 is multiplied by the factor $$j \text{ cotangent } (px\ \pi/2$$

It is thus apparent that as the pitch $p$ approaches 1 the imbalance between the paralleled circuits approaches zero. In this way, by keeping the phase angle difference between circuits 3 and 4 very small, the circuits can be connected in parallel without experiencing excessive current components which circulate therebetween.

Similarly, the foregoing relationships are applicable to circuits 1 and 2 of phase belt A'. Phasors $1_r$ and $2_r$ in FIG. 3 represent vector sum of the top- and bottom-layer windings $1_t$, $2_t$, $1_b$ and $2_b$ which constitute circuits 1 and 2. Phase belt A' has the same pitch as phase belt A, be connected is rotated 180° within the stator core with respect to phase belt A so that the voltages generated in the top and bottom layer windings of phase A' are in direct phase opposition to those generated in the bottom and top layer windings of phase belt A, respectively. From this it will be apparent that the voltage of circuit 1 is in phase with that of circuit 3; and the voltage of circuit 2 in phase with circuit 4. All four circuits may thus be paralleled, using common connection rings.

Returning to FIGS. 1 and 2, the circuits which comprise phase belts A and A' are all connected in parallel, the paralleled circuits of the two phase belts thus constituting one phase of a six-phase winding. The other five phases of the armature winding are constructed in a manner similar to the phase described above. Three of the phases which are located 120° apart may be advantageously connected at a common point to form a first, wye-connected three-phase winding. In the embodiment illustrated in FIG. 2, phases A, B and C which are comprised of phase belt pairs A, A', B, B', and C, C' may comprise one three-phase winding. One end of each of the parallel circuits which constitute the phase belts is connected to a connection ring such as connection ring 16 shown in FIG. 1, while the opposite end of each of the circuits of each phase belt are connected to other, individual connection rings. In FIG. 15 the distal ends of phase belts A and A' are connected to connection ring 17 which provides one phase of the three-phase power output. Similar rings may be connected to the distal ends of phases B and C which are comprised of phase belts B, B' and C, C' respectively, to provide the remaining two phases of power.

It will be seen that the winding pattern of FIG. 2 is subdivided into 12 segments such that two sets of three-phase windings may be provided. In a manner similar to that set forth above, a second set of three phase windings D, E and F are constituted by phase belts D, D', E, E', and F, F' respectively. One end of each of the parallel circuits constituting the phase belts of the second set of windings may be connected to a common element, such as connection ring 16, while the distal ends may be brought out to three additional phase connection rings so that the total of six phases of power are provided by the machine. The six resulting phases may be brought out of the generator and connected to a suitable transformer for shifting the power outputted by the first winding by 30°, bringing it into phase with the output of the second winding. System output power is thus three phase, although derived from a multi-three phase winding.

It will be evident to those skilled in the art that the invention herein disclosed is not limited to a six phase, twelve phase belt winding. For example, a nine-phase winding can be utilized with one or two phase belts per pole. Such a nine-phase configuration will advantageously take the form of three three-phase, wye-connected armature windings, whose power outputs are 20 electrical degrees apart. As known in the art, the outputs of two of the three windings may be phase-shifted 20 degrees to provide a three-phase system output. In addition to this alternative form of the multi-three phase configuration, other modifications will occur to those skilled in the art.

It will also be evident to those skilled in the art and familiar with U.S. Pat. No. 3,408,517, that the benefits of this invention are not restricted to phase belt winding patterns such as that used in the particular embodiment described, in which the conductors of circuit in the phase belt are located in symmetrical relationship about the centerline of that phase belt half. As shown in U.S. Pat. No. 3,408,517, the same reduction in imbalance voltage between circuits given quantitatively by the same interchange factor, $j$ cotangent $(p\pi/2)$, is obtained for the resultant voltage regardless of whether this condition of symmetry of circuit positions around the phase belt half centerline is maintained or not, provided that the circuit sequence is in transposed order for the two halves of the phase belt. Thus, the circuit sequence in one of the phase belt halves can be selected to give the minimum imbalance between circuits without regard to conditions of circuit symmetry about the centerline, and this value of imbalance can then be substantially reduced by arranging the sequence of circuits in the other half of the phase belt in transposed order.

From the foregoing it is evident that a multi-three phase generator has been described whose output can be reduced to three-phase power by well-known means, and whose terminal voltage for a given KVA output will be much lower than can be obtained from previously known means.

It is intended that the appended claims cover all such modifications as follow within the true spirit and scope of the invention.

I claim:

1. In a dynamoelectric machine including a rotatable field element having at least two poles and a stationary polyphase armature winding, said armature winding comprising a top and a bottom layer of winding soil sides connected to form at least two phase belts per phase per pole pair, the coil sides of each phase belt being displaced by substantially 180° electrical degrees with respect to the corresponding coil sides of the other of said phase belts, at least one phase belt of each phase comprising parts of at least two parallel-connected circuits, each such parallel circuit comprising at least two coil sides in series connection, the coil sides of the top layer half of said phase belt having a first circuit sequence, and the coil sides of the bottom layer half having a transposed sequence, the average pitch of the coils in said phase belt being substantially greater than five-sixths, the resulting phases being connected to form at least two separate three-phase windings displaced in phase from one another.

2. The combination according to claim 1, wherein the average coil pitch is on the order of eleven-twelfths.

3. The combination according to claim 1, wherein the average coil pitch is twenty-one twenty-fourths or greater.

4. A dynamoelectric machine as recited in claim 1, wherein said phase windings of said armature winding comprise two separate three-phase windings displaced in phase from one another by 30 electrical degrees.

5. A dynamoelectric machine as recited in claim 1, wherein said armature winding comprises nine phase windings, said phase windings being connected to form three separate sets of three-phase windings displaced in phase from one another by 20 electrical degrees.

6. A dynamoelectric machine as recited in claim 1, wherein there are provided at least 12-phase belt in said armature winding.

7. A dynamoelectric machine as recited in claim 1, wherein the circuit sequence of coil sides lying in one layer of a phase belt of said winding is 1221, and the circuit sequence of the transposed coil sides lying in the other layer of said phase belts of said winding is 2112.

8. A dynamoelectric machine as recited in claim 1, wherein the circuit sequence of coil sides lying in one layer of a phase belt of said winding is 1212, and the circuit sequence of the transposed coil sides lying in the other layer of said phase belts of said winding is 2121.

9. In a polyphase armature winding including a plurality of winding coil sides disposed in a first and a second layer
- means for series-connecting coil sides in a first layer with coil sides in a second layer to form a plurality of individual circuits;
- means for connecting groups of said circuits in parallel to form pairs of phase belts, each of said phase belts being displaced by substantially 180 electrical degrees with respect to the other phase belt of the pair, the coil sides of said circuits which lie in the same winding layer being adjacent one another;
- the circuits of each phase belt which lie in a first layer of a phase belt being disposed in a first sequence, and the circuits of each phase belt which lie in the second layer being disposed in a sequence which is the transposition of said first sequence;
- means for connecting in parallel pairs of phase belts having voltages of similar phase and magnitude generated therein;
- means for connecting said phases into groups of three so as to provide at least two phase-displaced three-phase windings.